United States Patent
Ma (10) Patent No.: US 6,805,799 B2
(45) Date of Patent: Oct. 19, 2004

(54) SIMULATED MOVING BED CHROMATOGRAPHIC FOCUSING

(76) Inventor: Qi-Feng Ma, 28271 Trailriders Dr., Rancho Palos Verdes, CA (US) 90275

(*) Notice: Subject to any disclaimer, the term of this patent is extended or adjusted under 35 U.S.C. 154(b) by 44 days.

(21) Appl. No.: 10/375,987

(22) Filed: Mar. 1, 2003

(65) Prior Publication Data

US 2004/0118781 A1 Jun. 24, 2004

Related U.S. Application Data

(60) Provisional application No. 60/436,104, filed on Dec. 21, 2002.

(51) Int. Cl.$^7$ .............................................. B01D 15/08
(52) U.S. Cl. ..................................... 210/659; 210/198.2
(58) Field of Search ................................ 210/635, 656, 210/659, 662, 198.2

(56) References Cited

U.S. PATENT DOCUMENTS

| | | | |
|---|---|---|---|
| 2,985,589 A | | 5/1961 | Broughton et al. |
| 3,706,812 A | | 12/1972 | Rosset et al. |
| 4,031,155 A | | 6/1977 | Healy et al. |
| 4,031,156 A | | 6/1977 | Geissler et al. |
| 5,565,104 A | | 10/1996 | Priegnitz et al. |
| 6,069,289 A | | 5/2000 | Dandekar et al. |
| 6,217,774 B1 | * | 4/2001 | Nagamatsu et al. ........ 210/659 |
| 6,413,419 B1 | * | 7/2002 | Adam et al. ............. 210/198.2 |
| 6,471,870 B1 | * | 10/2002 | Nicoud et al. ............. 210/659 |
| 6,712,973 B2 | * | 3/2004 | Adam et al. ................. 210/659 |
| 2001/0009236 A1 | | 7/2001 | Heikkila et al. |
| 2002/0017492 A1 | | 2/2002 | Jensen et al. |
| 2003/0113866 A1 | * | 6/2003 | Necina et al. ............. 435/69.1 |

FOREIGN PATENT DOCUMENTS

WO          WO0033934          6/2000

OTHER PUBLICATIONS

Houwing, et al. Effect of salt gradient on the separation of diluted mixtures . . . J. Chromatography A 952 (2002) 85–98.

Antos, et al. Two–step solvent gradient in simulated Moving bed J. Chromatography A. 944 (2002)77–91.

Houwing, et al. Optimization of Azeotropic protein separations J. Chromatography A 944 (2002) 189–201.

Jensen, et al. Novel simulated moving bed method for reduced solvent J. Chromatog. A 873 (2000) 149–162.

Abel, et al. Solvent gradient operation of simulated moving bed J. Chromatog. A. 944 (2002) 23–39.

Antos, et al. Application of gradient in the simulated moving bed Chemical Engineering Science, 56 (2001) 6667–6682.

* cited by examiner

Primary Examiner—Ernest Q. Therkorn (57) ABSTRACT

A continuous simulated moving bed chromatographic focusing process is disclosed for separating and concentrating multiple components from a complex mixture. Said process comprises a number of zones that are connected in series. An eluent flows unidirectionally along the zones and decreases its desorption strength by sequential dilutions zone after zone. Each zone is detachably installed with a chromatographic column and the columns are periodically relocated one zone upstream. Multiple components of a sample are introduced into a downstream zone, absorbed on the column in the zone, brought zone by zone upstream by column relocations, and selectively desorbed from different zones to get separation. A component desorbed from one zone is reabsorbed by the column in the adjacent downstream zone and is again brought back to said zone by column relocation. Said component is thus retained between said zone and said adjacent downstream zone and is accumulated by continuous sample feeding and repeatedly column relocation.

37 Claims, 6 Drawing Sheets

SIMULATED MOVING BED CHROMATOGRAPHIC FOCUSING

PRIORITY CLAIM

This application claims benefit of priority of U.S. Provisional Application serial No. 60/436,104 filed on Dec. 21, 2002 titled "Simulated Moving Bed Chromatographic Focusing".

FIELD OF THE INVENTION

The present invention relates to a continuous chromatographic process using a simulated moving bed structure of multiple zones. More specifically, the invention relates to focusing individual components of a mixture in different zones where said components are separated and concentrated.

BACKGROUND

Chromatographic separation can be classified into two modes, the batch-type mode and the continuous mode. Most of the conventional chromatographic applications are conducted by the batch-type mode. In general, the batch-type chromatography separates a sample by batches. The process for each batch comprises a sample loading step, an elution/fraction collection step, and a column regeneration step. The advantage of the batch-type separation is that it can separate complex mixtures. To insure a good resolution, sample loading should be less than 1% of the total capacity of a chromatographic column. The low sample loading is one of the disadvantages of the batch-type chromatography for production process. Since a new batch will not start until the whole process of the previous batch completes, batch-type chromatography also takes longer time for separating a defined quantity of products. Another disadvantage of the batch-type chromatography is the limited length of a chromatographic column that prevents from purifying closely related compounds.

Figure 1:
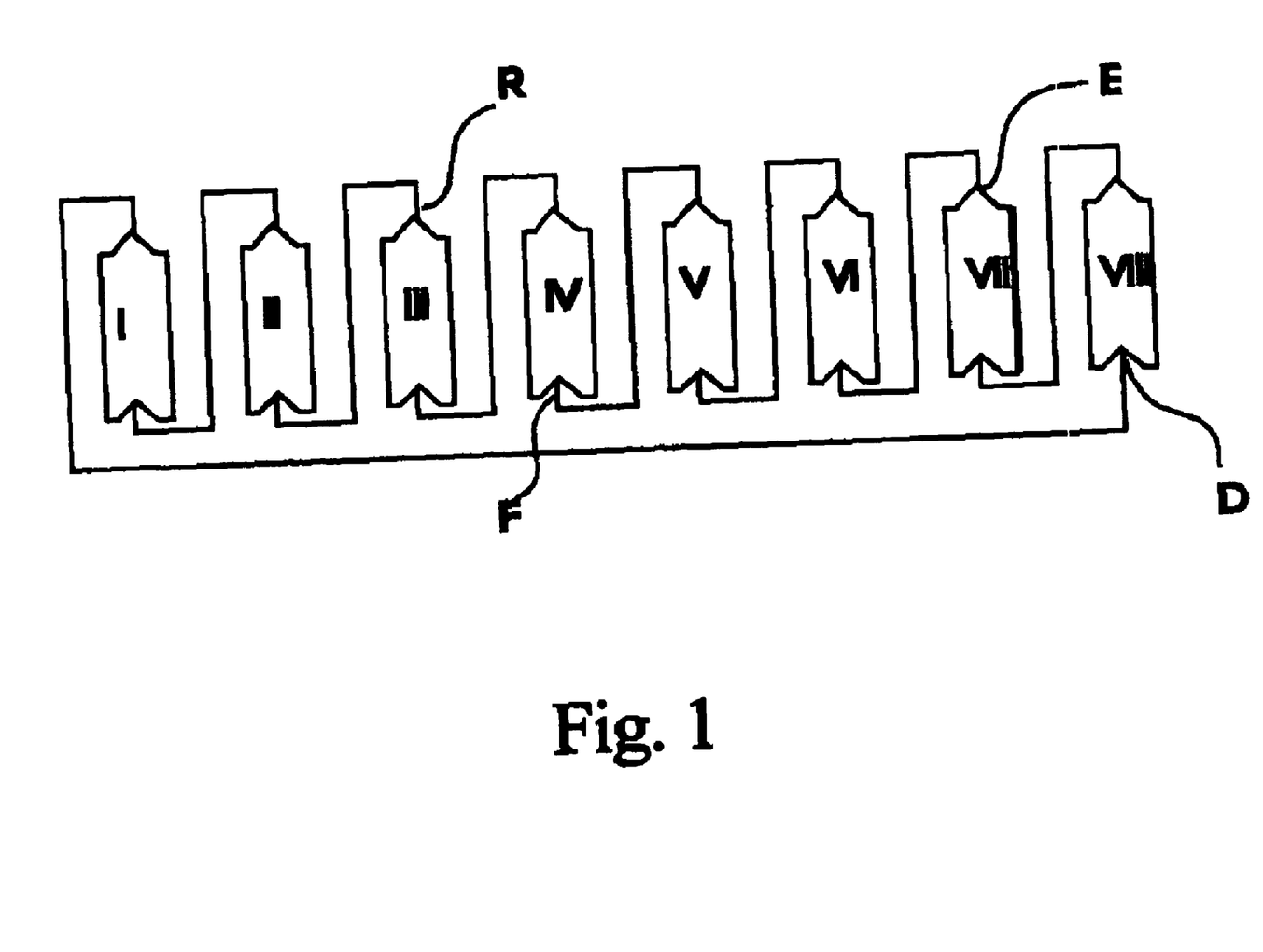
FIG. 1 is a schematic view of the classical simulated moving bed chromatography

Unlike the batch-type chromatography, the continuous chromatography is a process of continuous sample feeding, continuous elution, and continuous fraction collection. The sample feeding, the chromatographic elution, and the fraction collection are conducted simultaneously, which increases sample loading, enhances productivity, and saves eluent and chromatographic medium. A typical continuous chromatography is the simulated moving bed chromatographic system. FIG. 1 schematically shows a simulated moving bed chromatographic system. It comprises several zones that form a circular loop and are fluidly connected in series. The chromatographic columns are in these zones and can simultaneously relocate from one zone to the next in a unidirectional manner. There are two inlets and two outlets in different zones of the loop. Inlet F is for feeding a sample, inlet D is for introducing a desorbent, outlet R is for collecting a weakly absorbed component (raffinate), and outlet E is for collecting a strongly absorbed component (extract). A unidirectional fluid flow is maintained in the loop and is countercurrent to the direction of the column relocation. A sample is continuously fed into the system through the sampling inlet F, and the weakly absorbed component flows out of the system from the outlet R. The strongly absorbed component stays in the column and is moved with the column to the next zone upstream, where it is eluted out through the outlet E. The simulated moving bed chromatographic system has been successfully used for process purification of binary mixtures, such as enantiomer pairs, sucrose and non-sugar fraction, and xylene and its isomers. The main advantage of the simulated moving bed chromatography is the exceptional high throughput that makes the chromatographic separation economical. However, the simulated moving bed chromatography is limited to the separation of binary mixture and cannot be used to separate multiple components from complex mixtures. It even cannot be used for purifying only one component from a complex mixture if the said component is not the weakest absorbed or the strongest absorbed component in the mixture.

The limitation for the simulated moving bed chromatography is from its separation mechanism. A component of a mixture will experience two movements in the simulated moving bed system. The desorbent elutes the component downstream and the column relocations bring the component upstream. If the desorbent flows faster, the component will have an overall downstream movement. If the column relocations take place more frequently, the component will have an overall upstream movement. When two components are introduced from inlet F into the system, they will have different downstream movement speeds if they have different absorption strengths toward the columns. If the flow rate of the desorbent and the frequency of the column relocation are adjust to such a degree that the overall movement of the strongly absorbed component is in upstream direction and the overall movement of the weakly absorbed component is in downstream direction, then the weakly absorbed component will be collected from downstream outlet R and the strongly absorbed component will be collected from upstream outlet E. If a mixture contains more than two components, they will move either upstream to contaminate the strongly absorbed component or downstream to contaminate the weakly absorbed component. The attempt to have more zones and more outlets in the simulated moving bed system for separation of complex mixtures does not work either due to the same reason. The simulated moving bed chromatography also fails to purify a single component from a complex mixture if said single component is not the strongest or the weakest absorbed component in the mixture since said single component would be co-eluted with other impurities. Therefore, the separation mechanism has to be different from that of the simulated moving bed chromatography in order to separate a complex mixture.

The simulated moving bed chromatography is a dilution process and the concentration of the separated components in the collected fractions are dozens-fold lower than that in the sample. In order to obtain a separated component of high concentration and to save eluent, several prior arts describe a modified simulated moving bed chromatography with gradient elution. U.S. Pat. Nos. 4,031,155, 4,031,156, U.S. patent application Ser. No. 20020017492, and WO0033934 describe a desorption gradient that has two elution strengths along the fluid flow and is generated by the difference of desorption strengths between the desorbent and the sample. This modification is claimed to save the desorbent and to obtain a fraction with a higher concentration of the separated component than its concentration in the sample. However, the separation mechanism is the same as the classical simulated moving bed chromatography and is still a binary separation process. The function of the gradient is to make the upstream-moving component eluted out of the system faster and to use less desorbent. The same type of gradient is also described by Dorota Antos et al. (Chemical Engineering Science, vol. 56, (2001) 6667–6682), Thomas B. Jensen et al. (Journal of Chromatography A, 873 (2000) 149–162), Stefanie Abel et al. (Journal of Chromatography A 944 (2002) 23–29), Joukje Houwing et al. (Journal of Chromatography A, 944 (2002) 189–201), Dorota Antos et al. (Journal of Chromatography A, 944 (2002) 77–91), and Joukje Houwing et al. (Journal of Chromatography A, 952 (2002) 85–98). U.S. Pat. No. 6,069,289 describes another gradient process that has two desorbents and is claimed to separate a mixture into three fractions. It emphasizes on the fractioning of the mixture and dose not have sample concentrating effect since the process requires that the volume of the second extract is 2.2 to 10-times of the sample feeding volume, which means 2.2 to 10 times dilution of the sample after chromatography. The mechanism is again the same as that of the classical simulated moving bed chromatography.

A process for continuous chromatography that is based on a mechanism other than the mechanism for the classical simulated moving bed chromatography is needed for the separation of a complex mixture. The process should be able to purify complex mixtures, should be a continuous process of high productivity and low production cost, should significantly save the chromatographic media and the eluent, should have higher yield, and should obtain fractions in which the separated components have higher concentrations than in the feeding sample.

BRIEF DESCRIPTION OF THE PRESENT INVENTION

The key feature of the present invention is the formation of a focusing section (F section) for separation of complex mixtures by a new mechanism called simulated moving bed chromatographic focusing. The F section comprises f zones that are fluidly connected in series and are sequentially numbered from zone F(1) to zone F(f). A column for chromatography is detachably installed in each zone. A stream of main eluent enters zone F(f) and exits zone F(1). The main eluent is modified in such a way that it decreases its desorption strength as it leaves a zone and enters an adjacent downstream zone. It can be viewed that at least a few zones of the F section have eluents different from each other in terms of desorption strengths. The zone series can be viewed as a circle with zone F(1) adjacent to zone F(f) although zone F(1) and zone F(f) may not be fluidly connected. The columns periodically relocate from the current zones to the corresponding adjacent zones in a direction against the flow of the main eluent. The components of a sample mixture are introduced into a downstream zone, adsorbed on the column in the zone, brought zone by zone upstream, and desorbed from different zones one component after the other to get separation. A focused component is kinetically retained between zone F(i) wherein the eluent has lower desorption strength and zone F(i +1) where the eluent has higher desorption strength. The component in zone F(i+1) is strongly desorbed and eluted downstream by the main eluent to zone F(i) where it meets a new introduced mixture and reabsorbed in the column located in zone F(i). The component is thus enriched and is brought to zone F(i+1) again by column relocation. Due to the repeatedly column relocation and the continuous sampling, the component is gradually accumulated in between zone F(i) and zone F(i+1). If a small fraction of the main eluent is collected from in-between zone F(i) and zone F(i+1), a highly concentrated and purified component is obtained.

The present invention realizes separation of a complex mixture by a continuous chromatographic process, which has not been fulfilled practically by the existing chromatographic methods. The process of the present invention significantly enhances productivity, decreases production cost, increases product yield and purity, and reduces post-chromatographic treatment. Compared to the batch-type chromatography, it significantly saves chromatographic medium, solvent, and separation time and significantly increases product yield. Compared to the simulated moving bed chromatography, the present invention has the advantage of separation of complex mixtures and provided a separated component of higher concentration.

DETAILED DESCRIPTION OF THE PREFERRED EMBODIMENTS

Figure 2A:
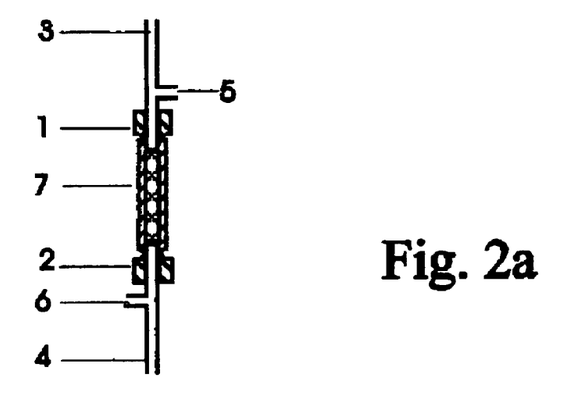
FIGS. 2A and 2B are schematic views of one embodiment of the present invention.

The continuous chromatographic focusing of the present invention is realized in a focusing section containing a number of zones. As shown in FIG. 2a, each zone has an incoming joint 1, outgoing joint 2, said incoming joint 1 is in fluid communication with an inlet tube 3 that has a branched opening 5. Said outgoing joint 2 is in fluid communication with an outlet tube 4 that has a branched opening 6. A column 7 for chromatography is detachably installed between incoming joint 1 and outgoing joint 2. Column 7 can be formed by packing a tubular structure with any chromatographic stationary phases that include normal phases, reversed phases, ion exchange phases, affinity phases, chelating phases, chiral phases, ligand exchange phases, size exclusion phases, and polymeric phases. Column 7 can also be made by the monolithic phases. Incoming joint 1 and outgoing joint 2 can be any connecting means that not only allows fluid communications among inlet tube 3, column 7, and outlet tube 4, but also allows quick relocation of column 7 among the focusing zones without fluid leakage. The inlet ports of a fluid diverting rotary valve represent typical incoming joints 1 and outgoing joints 2. The branched openings 5 and 6 are for fluidly connecting adjacent zones. Inlet tube 3 is for fluid delivery into the section and outlet tube 4 if for fluid withdrawal from the section. Both fluid delivery and fluid withdrawal are controlled in terms of time duration, volume, and rate by a device that includes pumps of any type.

Figure 2B:
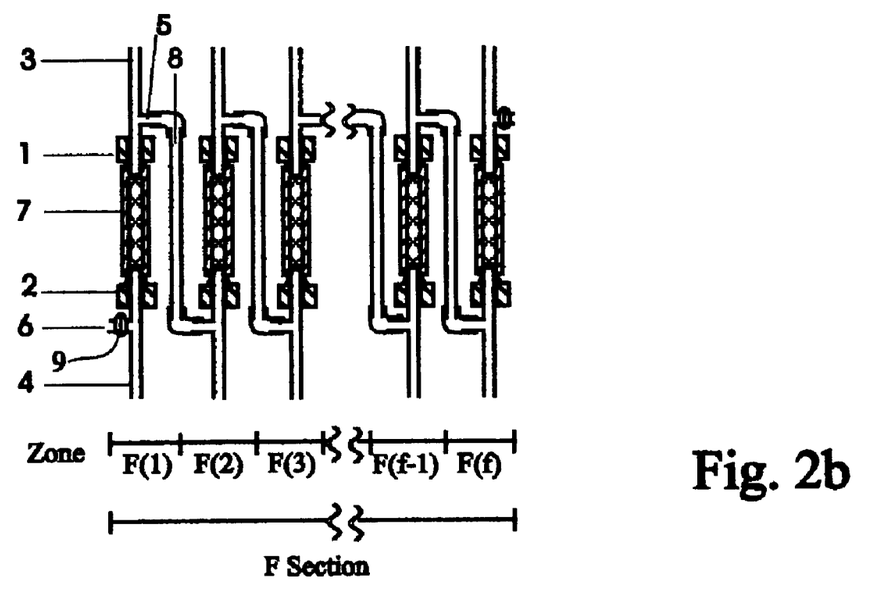

FIG. 2b schematically illustrates one process of the present invention. The process comprises the following operations:

1. Forming an F section for chromatographic focusing. The F section contains f zones where f is an integer and is larger than four. These zones are arranged in series and are numbered sequentially from zone F(f) to zone F(1) where F represents the F section and the number in the parentheses represents the position of a zone in the series. Zone F(f) is arbitrarily defined as the upstream end and zone F(1) is arbitrarily defined as the downstream end. The branched opening 5 of the inlet tube of one zone is connected to the branched opening 6 of the outlet tube of the adjacent upstream zone to form a flow passage 8 between the adjacent zones. Since zone F(f) and zone F(1) are the ends of the F section, the branched opening of the outlet tube of zone F(1) and the branched opening of the inlet tube of zone F(f) are sealed or eliminated during tube manufacturing to allow a stream of main eluent entering the inlet tube of zone F(f) and exiting the outlet tube of zone F(1).

2. Selecting at least four inlet tubes and at least two outlet tubes in the F section for fluid delivery and fluid withdrawal, blocking the unselected outlet tubes and the unselected inlet tubes, determining fluid compositions and flow rates for each of the selected outlet tubes and the selected inlet tubes to generate a desired desorption gradient that includes ion strength gradient, hydrophobic gradient, pH gradient, chelating gradient, hydrogen bonding gradient, affinity gradient, chiral gradient, and other gradients for chromatography. The means for blocking includes stopcocks and three-way valves. Instead of blocking, said unselected inlet tubes and said unselected outlet tubes may be optionally built without the branched openings so that they can replace the branched openings to form the fluid passages;

3. Performing continuous chromatographic focusing by:
  (1) continuously and simultaneously introducing and withdrawing the following fluids of defined compositions at defined flow rates through the selected inlet tubes and the selected outlet tubes, including:
    introducing a main eluent of high desorption strength into the inlet tube of zone F(f);
    introducing a sample solution into at least one selected inlet tube;
    introducing focusing solutions of lower desorption strengths into the remaining selected inlet tubes. A focusing solution is introduced through the inlet tube of one zone and is mixed with the eluent from its adjacent upstream zone to form a different eluent of lower desorption strength that flows into said zone, a desorption gradient being thus generated with zone F(f) having the highest desorption strength and zone F(1) having the lowest desorption strength;
    withdrawing small volumes of fluids from the selected outlet tubes and collecting the flow-out fluid of the main eluent from the outlet tube of zone F(1);
  (2) periodically and simultaneously relocating the column in zone F(f) to zone F(1) and relocating the rest columns one zone upstream for continuous chromatographic focusing. The focusing mechanism can be understood by the following explanations. A mixture is introduced into the F section from the inlet tube of one zone. Some components have very weak absorption to the column in said zone and are eluted by the eluent of said zone to downstream zones. Other Components are absorbed on the column, brought zone by zone upstream by column relocations, selectively desorbed from different zones due to the differences in desorption strengths, and separated from each other. A desorbed component from one zone is eluted back to the adjacent downstream zone where said component is reabsorbed on the column that contains newly introduced mixture. Said component is again brought to the said zone by the next column relocation. With continuous sampling and repeatedly column relocations, said component is retained between said zone and said downstream zone, separated from other components, and concentrated. If a small volume of the fluid is collected from the outlet tube of said zone, a purified component with a high concentration is obtained. Similarly, those components that are not desorbed from said zone would be brought to further upstream zones, retained in the appropriate zones, separated from each other and focused there to accumulate in high concentrations. Those components unabsorbed in said zone will be eluted downstream and will be retained in appropriate downstream zones in the same way.

Figure 3:
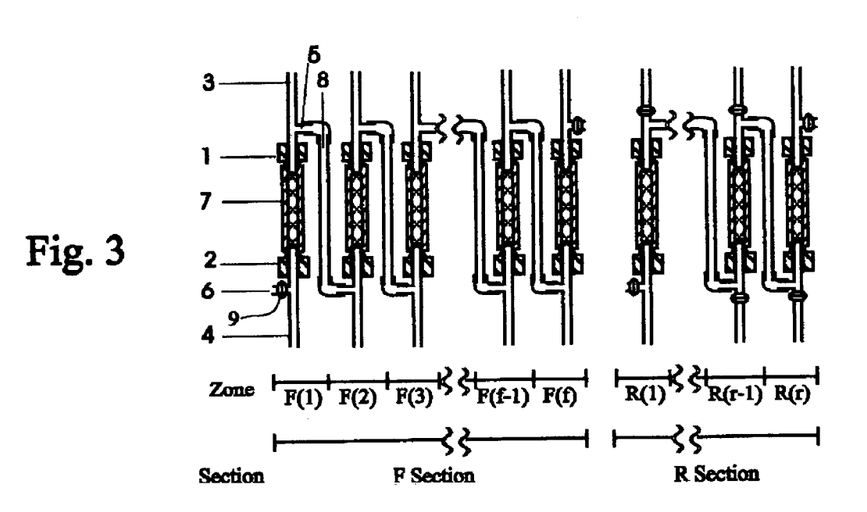
FIG. 3 is a schematic view of another embodiment of the present invention.

FIG. 3 shows another embodiment of the present invention. It is an extension of the embodiment in FIG. 2 with an additional R section for column regeneration. The R section contains r zones where r is an integer. These zones are numbered sequentially from zone R(r) to zone R(1) and are connected in the same way as the zones of the F section of the embodiment in FIG. 2b. The R section is positioned upstream of the F section of the embodiment in FIG. 2b with zone R(1) adjacent to zone F(f). The branched opening 5 of the inlet tube 3 of zone R(r) and the branched opening 6 of the outlet tube 4 of zone R(1) are sealed or eliminated during tube manufacturing to form a flow path from the inlet tube of zone R(r) to the outlet tube of zone R(1). If no additional fluid delivery and fluid withdrawal in the R section, the inlet tubes other than the inlet tube of zone R(r) and the outlet tubes other than the outlet tube of zone R(1) are preferably sealed, or are preferably built without the branched openings to replace the corresponding branched openings for fluid passage connection. The modifications to the process of the embodiment in FIG. 2b further comprises:
  (1) an additional fluid introducing and withdrawal: continuously introducing a regeneration solution from the inlet tube of zone R(r) and collecting the regeneration solution from the outlet tube of zone R(1);
  (2) a modification on column relocation: periodically and simultaneously, relocating the column in zone R(r) to zone F(1), relocating the column in zone F(f) to zone R(1), relocating the rest columns from the current zones to the corresponding adjacent upstream zones.

The embodiment in FIG. 3 is for removing impurities that is tightly adsorbed on the column in zone F(f). The regeneration solution has higher desorption strength than the eluent in zone F(f) and washes said impurities away from the column as said column relocates to the R section from zone F(f). In some cases, the R section may comprise one zone and the regeneration solution enters the inlet tube of the zone and exits the outlet tube of said zone. The advantage of more zones in the R section is a saving of the regeneration solution. The process with 4 zones in the R section will use one-fourth of the regeneration solution than the process with one zone in the R section.

Figure 4:
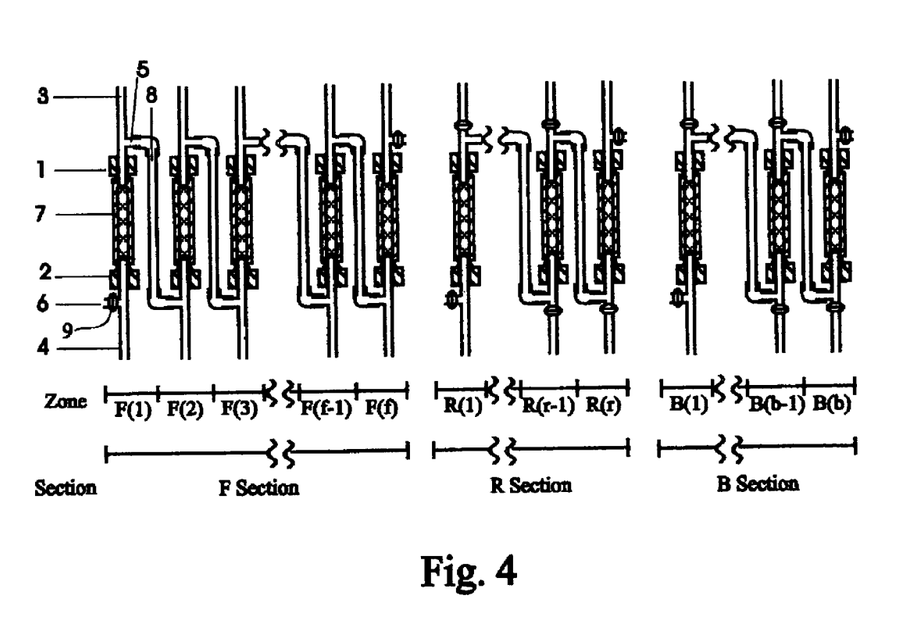
FIG. 4 is a schematic view of another embodiment of the present invention.

Since the column in zone R(r) of the R section will relocate to zone F(1) of the F section and will bring the regeneration solution of high desorption strength to zone F(1), an eluent of high desorption strength will temporarily present in zone F(1) after each column relocation. This may affect some applications where the lower and constant eluent strength in zone F(1) is important. FIG. 4 shows an embodiment for solving this problem. It is an extension of the embodiment in FIG. 3 with an additional B section for column balancing. The B section contains b zones where b is an integer. These zones are numbered sequentially from zone B(b) to zone B(1) and are connected in the same way as the zones of the F section of the embodiment in FIG. 3. The B section is positioned upstream of the R section of the embodiment in FIG. 3 with zone B(1) adjacent to zone R(r). The branched opening 5 of the inlet tube 3 of zone B(b) and the branched opening 6 of the outlet tube 4 of zone B(1) are sealed or eliminated during tube manufacturing to form a flow path from the inlet tube of zone B(b) to the outlet tube of zone B(1). If no additional fluid delivery and fluid withdrawal in the R section, the inlet tubes other than the inlet tube of zone R(r) and the outlet tubes other than the outlet tube of zone R(1) are preferably sealed, or are preferably built without the branched openings to replace the branched openings for fluid passage connection. The modifications to the process of the embodiment in FIG. 3 further comprises:

(1) an additional fluid introducing and withdrawal: continuously introducing a balancing solution from the inlet tube of zone B(b) and collecting the balancing solution from the outlet tube of zone B(1);

(2) a modification on the column relocation: periodically and simultaneously, relocating the column in zone B(B) to zone F(1), relocating the column in zone F(f) to zone R(1), relocating the column in zone R(r) to zone B(1), relocating the rest columns from the current zones to the corresponding adjacent upstream zones.

In some cases, the B section may comprise one zone and the balancing solution enters the inlet tube of said zone and exits the outlet tube of said zone. The advantage of more zones in the B section is the saving of the balancing solution. The process with 4 zones in the B section will use one-fourth of the balancing solution of the process with one zone in the B section.

Figure 5:
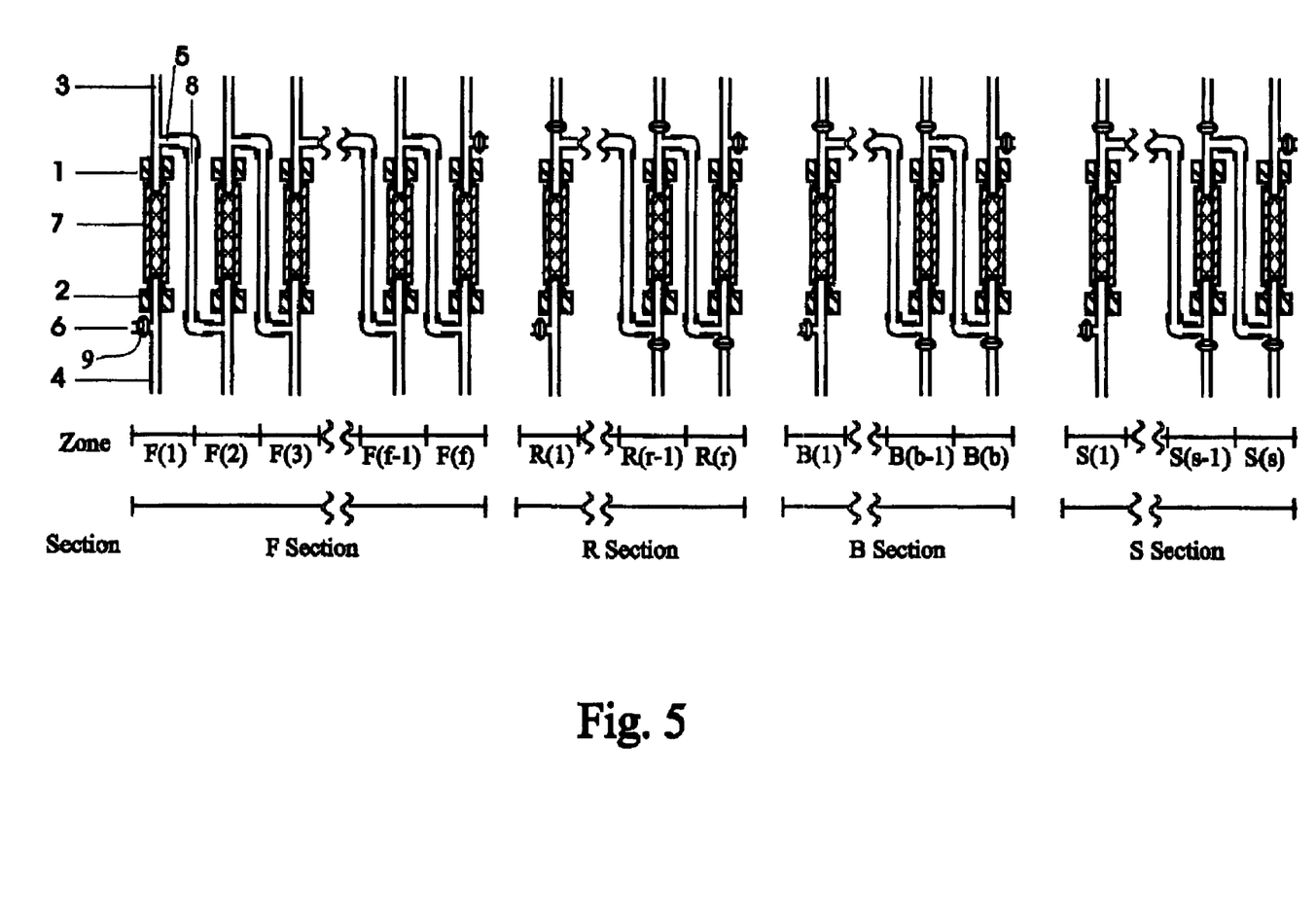
FIG. 5 is a schematic view of another embodiment of the present invention.

Rather than introducing a sample from the inlet tube of one zone in the F section as shown in FIGS. 2, 3, and 4, FIG. 5 shows another embodiment with sample introduction outside the F section. The embodiment in FIG. 5 is an extension of the embodiment in FIG. 4 with an additional S section for sample feeding. The S section contains s zones where s is an integer. These zones are numbered sequentially from zone S(s) to zone S(1) and are connected in the same way as the zones of the F section of the embodiment in FIG. 4. The S section is positioned upstream of the B section of the embodiment in FIG. 4 with zone S(1) adjacent to zone B(b). The branched opening 5 of the inlet tube 3 of zone S(s) and the branched opening 6 of the outlet tube 4 of zone S(1) are sealed or eliminated during tube manufacturing to form a flow path from the inlet tube of zone S(s) to the outlet tube of zone S(1). If no additional fluid delivery and fluid withdrawal in the S section, the inlet tubes other than the inlet tube of zone S(s) and the outlet tubes other than the outlet tube of zone S(1) are preferably sealed, or preferably built without the branched openings to replace the branched openings for fluid passage connection. The modifications to the process of the embodiment in FIG. 4 further comprises:

(1) an additional fluid introducing and withdrawal: continuously introducing a sample solution from the inlet tube of zone S(s) and collecting the flow out from the outlet tube of zone S(1), no sample introduction in the F section;

(2) a modification on column relocation: periodically and simultaneously, relocating the column in zone R(r) to zone B(1), relocating the column in zone B(b) to zone S(1), relocating the column in zone S(s) to zone F(1), relocating the column in zone F(f) to zone R(1), relocating the rest columns from the current zones to the corresponding adjacent upstream zones.

In some cases, the S section may comprise one zone and the sample solution enters the inlet tube of said zone and exits the outlet tube of said zone. The advantage of more zones in the S section is to load large quantity of samples and to prevent sample loss.

Figure 6:
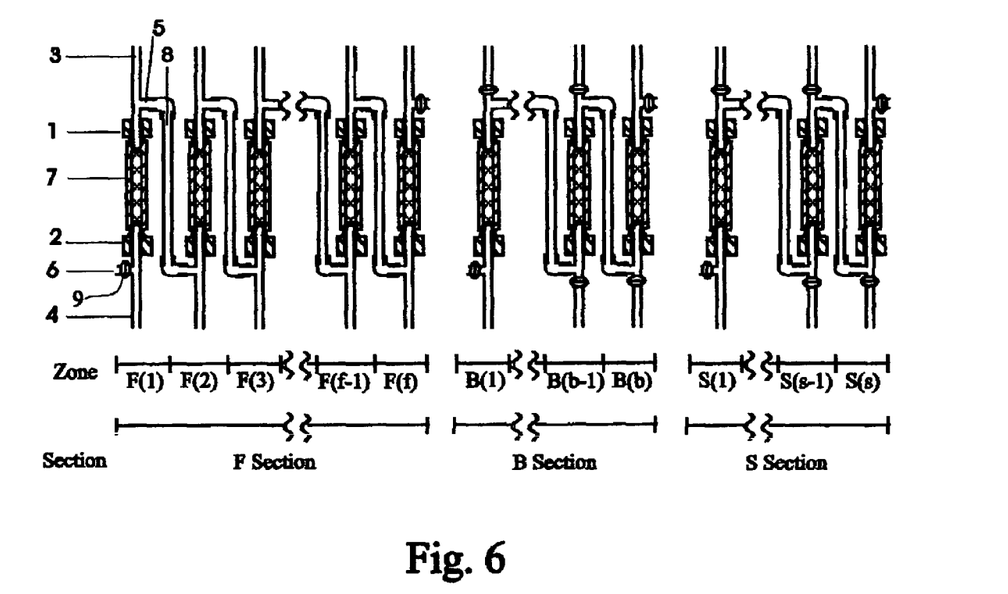
FIG. 6 is a schematic view of another embodiment of the present invention.

FIG. 6 shows another embodiment for the situation wherein there is no impurity absorbed in zone F(f) but a lower and consistent desorption strength in zone F(1) is desired. The embodiment in FIG. 6 is a reduction of the embodiment in FIG. 5. The R section in FIG. 5 is eliminated with zone B(1) adjacent to zone F(f). The modifications to the process of FIG. 5 further comprising:

(1) a modification on fluid introduction and withdrawal: eliminating the introduction and withdrawal of a regeneration solution;

(2) a modification on column relocation: periodically and simultaneously, relocating the column in zone F(f) to zone B(1), relocating the column in zone B(b) to zone S(1), relocating the column in zone S(s) to zone F(1), relocating the rest columns from the current zones to the corresponding adjacent upstream zones.

Similarly, the B section may be eliminated from the embodiment of FIG. 6. Other combinations of different sections may also formed and is not a limitation of the present invention.

Figure 7:
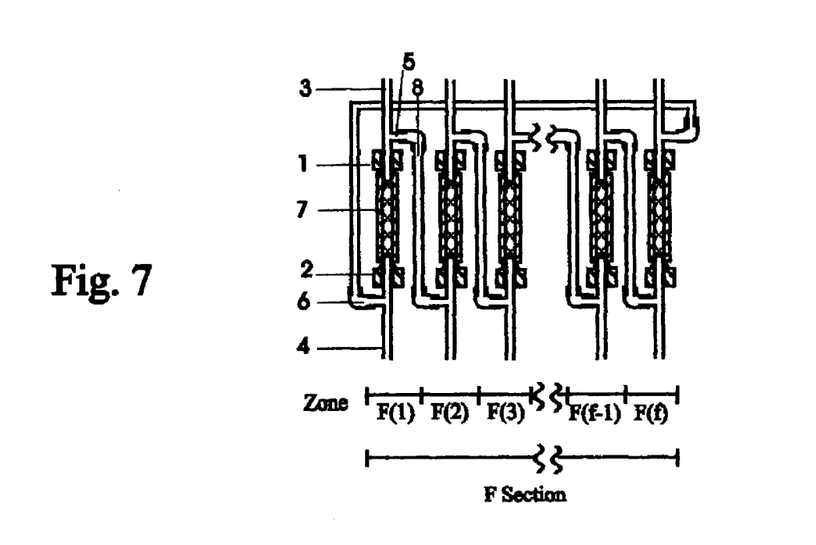
FIG. 7 is a schematic view of another embodiment of the present invention.

In some applications, there are no impurities in the flow out fluid from zone F(1) and no impurities absorbed on the column in zone F(f), the embodiment shown in FIG. 2b can be modified to another embodiment shown in FIG. 7. The branched opening 5 of the inlet tube 3 of zone F(f) and the branched opening 6 of the outlet tube 4 of zone F(1) in FIG. 2b are connected to form a flow passage. A flow direction controlling means 10 is installed in said flow passage to allow a partial fluid flow from zone F(1) to zone F(f). Said flow direction controlling means 10 include check valves, fluid pumps, and other conventional devices for a unidirectional flow. The advantage of the process in FIG. 7 is the saving of eluent.

Figure 8:
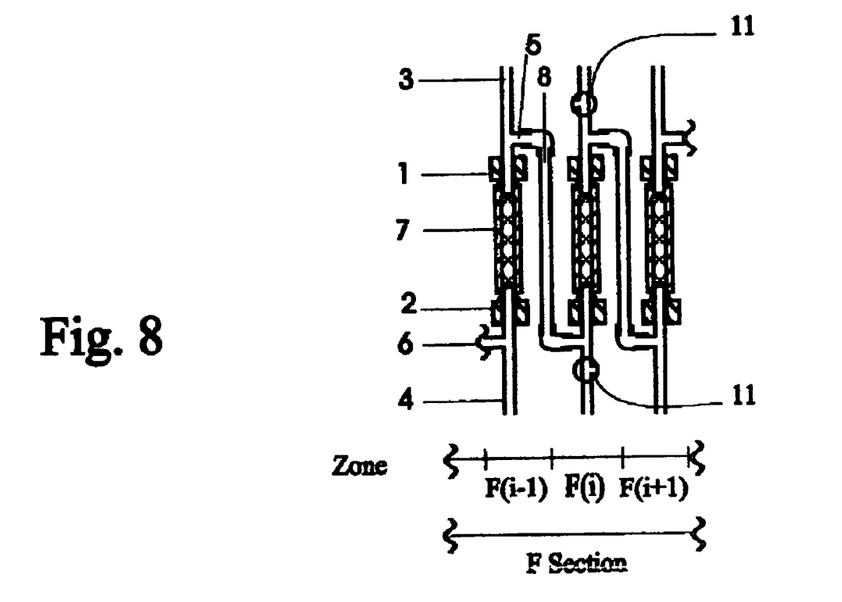
FIG. 8 is a schematic view of one modification of fluid withdrawing process of the present invention.

Other than the embodiments shown in FIG. 2 to FIG. 7 wherein the fluid withdrawal is continuous, FIG. 8 shows a discontinuous process for fluid withdrawal in the F section by fluid displacement. Fluid displacement allows to selectively collect fractions at a specific time during the process. It can happen for every column relocation. It can also happen once after several column relocations. The Fluid displacement in FIG. 8 provides flexibility for fluid withdrawal and has the advantage of obtaining purer products. As shown in FIG. 8, the fluid displacement takes place in zone F(i) of the F section where i is an integer smaller than f. A three-way valve 11 is installed at the branched position of the inlet tube and at the branched position of the outlet tube of zone F(i). The three-way valves are in full-open position during the regular operation described in FIG. 2 to FIG. 7. For fluid displacement, the regular operation is discontinued, and the following additional operations take place:

(1) simultaneously stopping fluid delivery and fluid withdrawal at least in the F section;

(2) Switching the three-way valves to block the fluid passage between the inlet tube of zone F(i) and the outlet tube of zone F(i+1) and the fluid passage between the outlet tube of zone F(i) and the inlet tube of zone F(i−1) to form a flow path from the inlet tube to the outlet tube of zone F(i) as shown in FIG. 8;

(3) introducing a displacement fluid from the inlet tube of zone F(i) and collecting the displaced fluid through the outlet tube of zone F(i);

(4) Switching the three-way valves back to the full open position and resuming the process described in FIG. 2 to FIG. 7.

Figure 9:
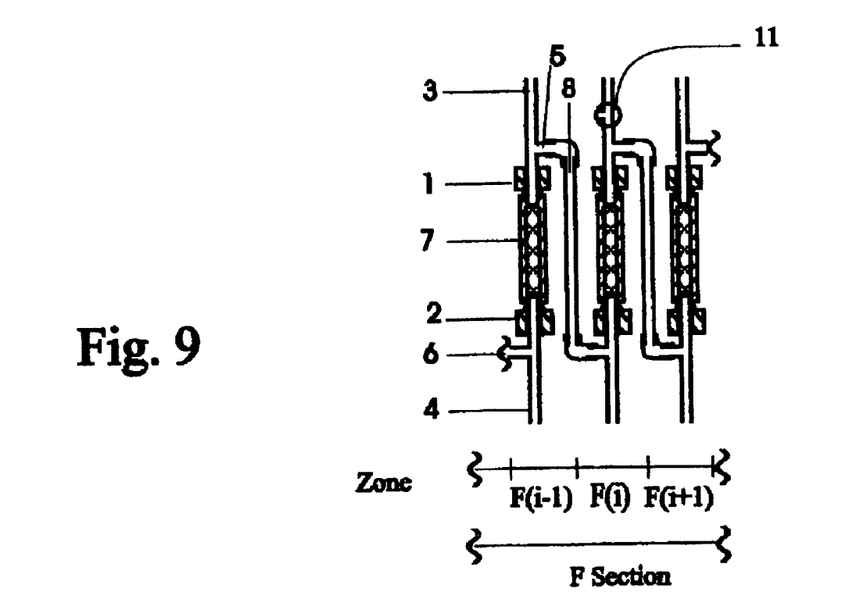
FIG. 9 is a schematic view of another modification of fluid withdrawal process of the present invention.

Unlike the embodiment shown in FIG. 8 wherein the fluid displacement takes place after the regular fluid flows stop, the fluid displacement shown in FIG. 9 happens while the regular fluid flows continue. As shown in FIG. 9, a three-way valve 11 is installed at the branched position of the inlet tube of zone F(i). The three-way valve is in the full-open position during regular operation and is switched to a position that blocks the flow passage between the inlet tube of zone F(i) and the outlet tube of zone F(i+1) to allow all the fluid from zone F(i+1) collected from the outlet tube of zone F(i+1) as shown in FIG. 9. Simultaneously, the focusing solution for the inlet tube of zone F(i) is replaced by a displacement fluid that has the same desorption strength as the eluent in zone F(i). After the fluid displacement, the displacement fluid is changed back to the regular focusing solution, the three-way valve is switched back to the full-open position, and the normal operation is resumed. It has the same advantage as the fluid displacement shown in FIG. 8.

The simultaneously column relocation of the present invention is preferably realized by a fluid diverting rotary valve similar to the art described in U.S. Pat. No. 3,706,812. It can also be realized by two rotary valves rotating synchronically. One rotary valve is installed on the inlet tubes side and behaves as the incoming joints. Another rotary valve is installed on the outlet tubes side and behaves as the outgoing joints. The two rotary valves in the same process allow that fluid withdrawal and fluid delivery take place simultaneously between the same two adjacent zones. The column relocation can also be realized by a mechanical process that includes simultaneously stopping fluid flows, disconnecting the columns from the current zones, reinstalling the columns to the adjacent upstream zones, and resuming the fluid flows. Any means for column relocation can be employed in the process of the present invention and is not a limiting aspect of the present invention.

The main difference between the present invention and the prior art of the simulated moving bed is the separation mechanism. The separation mechanism for simulated moving bed chromatography is to expel the binary mixture away from a zone in the opposing upstream and downstream directions and to collect the diluted fractions beyond said zone (see background for detailed discussion). The separation mechanism for the present invention is to retain different components in different zones and collect the concentrated fractions from said zones (see Brief description section for detailed discussion). The separation mechanism of the present invention derives many unique features that distinguish the present invention from the prior arts.

One feature of the present invention is the formation of eluent desorption gradient along the connected zones of the focusing section (F section). Ideally, the eluent in each zone should have a unique desorption strength. Each zone should retain one component of specific absorption. The more levels of desorption strengths present in the focusing section, the more components can be separated. The smaller is the difference in desorption strengths among the zones, the better is the separation. Even for the separation of only one component from a complex mixture, multiple levels of desorption strengths in the focusing section is still required. For example, a target component is focused between zone F(i) and zone F(i+1), if the difference of the elution strengths between these two zones is large, the target component will be contaminated by other components of the complex mixture. If the difference of the elution strengths between these two zones is small, the target component will disperse beyond these two zones and overlap with other components, diminishing the focusing function. In order to separate the target component from other components and to accumulate it in between zone F(i) and zone F(i+1), at least the zones downstream of zone F(i) should have an eluent with lower elution strength than the eluent in zone F(i) and at least the zones upstream of zone F(i+1) should have another eluent with higher elution strength than the eluent in zone F(i +1). It is critical to have a gradient of at least four different levels of elution strengths along the connected zones in the focusing section in order to perform the chromatographic focusing of the present invention. The requirement for the number of elution strengths in the focusing section is one characteristic that distinguishes the present invention from the prior art. Though many prior arts perform gradient separation in the simulated moving bed system, the gradient only consists two level of desorption strengths and is for binary separations.

As described in the embodiment of FIG. 2b, a component is kinetically focused between two neighboring focusing zones, zone F(i) and zone F(i+1). The component should be absorbed on the column in zone F(i) and should be desorbed from the column when it is relocated from zone F(i) upstream to zone F(i+1). For this reason, the eluent in zone F(i) must have lower desorption strength than the eluent in zone F(i+1) and a focusing fluid of lower desorption strength should thus delivered into the flow passage in-between zone F(i) and zone F(i+1). Since the component is desorbed in zone F(i+1) and is eluted back to zone F(i), the collection of the component should again take place in said fluid passage between said two zones. Therefore, fluid delivery and fluid withdrawal take place in the same fluid passage that connecting zone F(i) and zone F(i+1). All the gradients in the prior arts have fluid delivery and withdrawal in different fluid passages, which distinguishes the prior arts from the present invention.

The word "focusing" in the present invention means both retaining and accumulating. To collect a purified component in high concentration, the withdrawal volume should be relatively small. In practice, the withdrawal volume from a defined zone should be less than 50% of the eluent passing said zone. This is different from the prior art of U.S. Pat. No. 6,069,289 although the prior art has two desorbents in a SMB system. As described in the detailed description of the U.S. Pat. No. 6,069,289, "The flow rate of the second desorbent should range between about 2.5 to 12 times that of the feedstock. The flow rate of the second extract stream (withdrawal) should be about 90 percent of the second desorption flow rate". Though the prior art of U.S. Pat. No. 6,069,289 is claimed to separate a mixture into three groups rather than the binary separation in other prior arts, it is fundamentally different from the present invention both in the mechanism and the operation.

The present invention has many advantages over the prior arts. Since it is a continuous chromatographic process, it has a high productivity, a low production cost. It saves large quantity of chromatographic packing materials and solvents. It also saves separation time and the time for post-chromatographic process. The present invention can accumulate a diluted component in a zone and can squeeze the contaminants away from the component as the concentration of the component becomes higher. In this way, the present invention can provide purer products.

The present invention also has high purification yield. In regular liquid chromatography, a component is often eluted into many fractions and only one or two fractions have the acceptable purity. Other fractions are overlapped with impurities and are often discarded for economical reasons, greatly decreasing the production yield. In the present invention, the component is collected from only one zone wherein the component has the highest purity, the overlapped portion in the neighboring zones is still kept in the system until it is further focused in the said zone and get purified. No portion of the component is discarded in the present invention.

The present invention can be used both in laboratories and in production processes. An instrument based on the focusing principal of the present invention may be constructed for both laboratory and industrial separation. In general, any simulated moving bed design usable for the chromatographic focusing of the present invention falls into the scope of the present invention.

Example 1. Gradient separation of pig serum by a batch-type chromatography. A DEAE-Sepharose ion exchange resin (50 μm particle size, from Pharmacia) is packed in a column of 4.6 mm in inner diameter and 180 mm in length. The sample was prepared by dialyzing pig serum against 10 mM KCl buffer. 1 ml of the sample is loaded to the column. The column is then eluted by 30 ml of linear KCl gradient from 0.01 M to 0.4 M and 30 fractions were collected. The fractions were analyzed on a non-denaturing 10% polyacrylamide gel with the Laemmli buffer system. The most abundant serum protein, albumin, appears in the fractions 14–20. A fain band, designated as component B, were co-eluted with albumin in fractions 17 and 18.

Example 2. Simulated Moving Bed Chromatographic Focusing of Pig Serum. The simulated moving bed chromatographic focusing system is assembled as described for the embodiment of FIG. 5 and contains an F section of 5 zones, a R section of 1 zone, a B section of 1 zone, and a S section of 1 zone. Each zone has a column (30 mm×4.6 mm; L×ID) packed with DEAE-Sepharose resin (50 μm, from Pharmacia). The system is operated as described for the embodiment of FIG. 5 with column relocation every 1.5 min. Pig serum was the sample and was treated in the same way as in example 1. The composition and the flow rate of the fluids in the 8 zones are listed in Table 1. The system was operated for 40 column relocations. All the flow out fluids from zone S(1) and F(1) and 0.025 ml of the fluids from zone F(2), F(3), F(4), and F(5) were collected for each column relocation. The fractions corresponding to the $10^{th}$, $20^{th}$, $30^{th}$, and $40^{th}$ column relocations were analyzed on a 10% non-denaturing polyacrylamide gel in the Laemmli buffer system. Component B is focused mainly in the fraction of zone F(3) and appeared as an intense band. The band intensity increased gradually as the process progressed from step 10 to step 40. The band of component B is well separated from albumin that was focused out of the focusing zones and was washed out from zone R(1) by the regenerating solution.

TABLE 1

| Section | F | | | | | R | B | S |
|---|---|---|---|---|---|---|---|---|
| Zone | F(1) | F(2) | F(3) | F(4) | F(5) | R(1) | B(1) | S(1) |
| Introduced Fluid Name | Focusing Solution 1 | Focusing Solution 2 | Focusing Solution 3 | Focusing Solution 4 | Eluent | Regenerating Solution | Balancing Solution | Sample |
| Introduced Fluid composition | 0.08 M KCl | 0.1 M KCl | 0.095 M KCl | 0.125 M KCl | 0.2 M KCl | 0.6 M KCl | 0.15 M KCl | Pig serum |
| Flow rate for introduced fluid | 0.1 ml/min. | 0.1 ml/min. | 0.1 ml/min. | 0.1 ml/min. | 0.4 ml/min. | 1.0 ml/min. | 1.0 ml/min. | 0.5 ml/min. |
| Salt in each zone | 0.15 M | 0.16 M | 0.17 M | 0.185 M | 0.2 M | 0.6 M | 0.15 M | 10 mM |
| Withdrawal flow rate (ml/min.) | All the flow out | 0.025 ml | 0.025 ml | 0.025 ml | 0.025 ml | All the flow out | All the flow out | All the flow out |

Example 3. Simulated Moving Bed Chromatographic Focusing of Pig Serum with fluid withdrawal by fluid displacement. The simulated moving bed chromatographic focusing system is assembled as described for the embodiment of FIG. 5. The separation was carried out the same as described in example 2 except that the fluid withdrawal from zone F(3) was done every 5 column relocations by fluid displacement described in the embodiment of FIG. 8. The displacement fluid was 0.05 ml of 0.17 M NaCl for each withdrawal. Other fluid withdrawals were the same as in example 2. The fractions corresponding to the $10^{th}$, $20^{th}$, $30^{th}$, and $40^{th}$ column relocation were analyzed on a 10% non-denaturing polyacrylatide gel in the Laemmli buffer system. Compared to example 2, Compound B had more intense band in the fraction from zone F(3) and appeared purer.

Example 4. Simulated Moving Bed Chromatographic Focusing of Pig Serum by the embodiment in FIG. 2b. The simulated moving bed chromatographic focusing system contains an F section of 6 zones and is assembled as described for FIG. 2b. Each zone has a column (30 mm×4.6 mm; L×ID) packed with DEAE-Sepharose resin (50 μm, from Pharmacia). The system is operated as described for the embodiment of FIG. 2b with column relocation every 1.5 min. Pig serum was the sample and was treated in the same way as in example 1. The compositions and the flow rates of the introduced fluids in the 6 zones are listed in Table 2. The system was operated for 40 column relocations. All the flow out fluid from zone F1 and 0.03 ml of the fluids from zone F(2), F(3), F(4), F(5) and F(6) were collected for each column relocation. The fractions corresponding to the $10^{th}$, $20^{th}$, $30^{th}$, and $40^{th}$ column relocation were analyzed on a 10% non-denaturing polyacrylamide gel in the Laemmli buffer system. Most of the components were focused in a single zone except Albumin that is the most abundant protein in the serum and was dispersed between zone F(3) and zone F(4). The concentration of the components in the withdrawal fluids were about 10 times more concentrated than in the sample solution.

TABLE 2

| Section | F | | | | | |
|---|---|---|---|---|---|---|
| Zone | F(1) | F(2) | F(3) | F(4) | F(5) | F(6) |
| Introduced Fluid Name | Sample solution | Focusing Solution 1 | Focusing Solution 2 | Focusing Solution 3 | Focusing Solution 4 | Eluent |
| Introduced Fluid composition | Serum proteins in 0.01 M NaCl | H2O | H2O | 0.05 M KCl | 0.15 M KCl | 0.4 M KCl |
| Flow rate for the introduced Fluid (ml/min.) | 0.3 | 0.1 | 0.1 | 0.1 | 0.1 | 0.4 |
| Salt concentration in each zone | 0.17 M | 0.23 M | 0.26 M | 0.30 M | 0.35 M | 0.4 M |
| Withdrawal flow rate (ml/min) | All the flow out fluid | 0.03 ml | 0.03 ml | 0.03 ml | 0.03 ml | 0.03 ml |

Example 5. Simulated Moving Bed Chromatographic Focusing of monoclonal antibody by the embodiment in FIG. 2b. The simulated moving bed chromatographic focusing system contains an F section of 7 zones and is assembled as described for FIG. 2b. Each zone has a column (30 mm×4.6 mm; L×ID) packed with a cation exchange resin (50 μm). The system is operated as described for the embodiment of FIG. 2b with column relocation every 1.5 min. A chinese hamster cell culture containing the monoclonal antibody was the sample. The cell culture supernatant was dialyzed against 0.01 M NaCl and the dialyzed solution is used directly as the sample. The compositions and the flow rates of the introduced fluids in the 7 zones are listed in Table 3. The system was operated for 40 column relocations. The flow out fluid from zone F(1) and 0.03 ml of the fluids from zone F(3), F(5) and F(7) were collected for each column relocation. The fractions corresponding to the $10^{th}$, $20^{th}$, $30^{th}$, and $40^{th}$ column relocations were analyzed on a 10% non-denaturing polyacrylamide gel in the Laemmli buffer system. Most of the impurities were found in the fractions from zones F(1), F(3), and F(7). The fraction collected from zone F(5) contained monoclonal antibody. The concentration of the monoclonal antibody in the fraction of zone F(5) increased gradually during the process and the purity is about 98%. It was observed that the purity of the antibody also increased as the process was progressing.

Example 6. Simulated Moving Bed Chromatographic Focusing of total ginseng saponin by the embodiment in FIG. 2b. The simulated moving bed chromatographic focusing system contains an F section of 6 zones and is assembled as described in the embodiment of FIG. 2b. Each zone has a column (30 mm×4.6 mm; L×ID) packed with a reversed phase packing material (C18 on silica, 20 μm, from Phenomenex) and the organic solvent is a mixture of 50% Methanol (MeOH) and 50% Acetonitrile (CH3CN). The system is operated as described for the embodiment of FIG. 2b with column relocation every 1.5 min. A 5% total ginseng saponin dissolved in 20% Methanol was the sample. The compositions and the flow rates of the introduced fluids in the 6 zones are listed in Table 4. The system was operated for 20 column relocations. The total flow out fluid from zone F(1) and 0.03 ml of the fluids from zone F(2), F(3), F(4), F(5) and F(6) were collected for each column relocation. The fractions corresponding to the $10^{th}$ and $20^{th}$ column relocations were analyzed on a silica gel TLC plate with a mixture of 20% methanol and 80% chloroform as a developing solvent. The developed plate was stained with iodine for observation of the separated components. It was observed that protopanaxadiol was focused in zone 6, protopanaxatriol in zone 5, ginsenoside Rh1 in zone 4, gisenoside Rg2 in zone 2 and 3. The concentrations of the components in the withdrawal fluids were more concentrated than in the sample solution.

TABLE 3

| Section | F | | | | | | |
|---|---|---|---|---|---|---|---|
| Zone | F(1) | F(2) | F(3) | F(4) | F(5) | F(6) | F(7) |
| Introduced Fluid Name | none | Sample solution | Focusing Solution 1 | Focusing Solution 2 | Focusing Solution 3 | Focusing Solution 4 | Eluent |
| Introduced Fluid composition | none | Culture containing 0.01 M NaCl | H2O | H2O | H2O | H2O | 0.225 M NaCl |
| Flow rate for the introduced Fluid | | 0.3 ml/min | 0.2 ml/min. | 0.2 ml/min. | 0.1 ml/min. | 0.1 ml/min. | 0.4 ml/min. |
| Salt concentration in each zone | 0.07 M | 0.07 M | 0.09 M | 0.11 M | 0.15 M | 0.18 M | 0.22 M |
| Withdrawal flow rate (ml/min) | All the flow out | none | 0.03 ml | none | 0.03 ml | none | 0.05 ml |

TABLE 4

| Section | F | | | | | |
|---|---|---|---|---|---|---|
| Zone | F(1) | F(2) | F(3) | F(4) | F(5) | F(6) |
| Introduced Fluid Name | Sample solution | Focusing Solution 1 | Focusing Solution 2 | Focusing Solution 3 | Focusing Solution 4 | Eluent |
| Introduced Fluid composition | 5% ginseng saponin in 20% MeOH | H2O | H2O | H2O | H2O | 70% organic solvent |
| Flow rate for the introduced Fluid (ml/min.) | 0.3 | 0.1 | 0.1 | 0.1 | 0.1 | 0.4 |
| Organic solvent concentration in each zone | 30% | 35% | 40% | 46% | 56% | 70% |
| Withdrawal flow rate (ml/min) | All the flow out fluid | 0.03 ml | 0.03 ml | 0.03 ml | 0.03 ml | 0.03 ml |

What is claimed is:

1. A process for continuously separating and focusing components from a mixture, said process comprising:

(1) forming a F section for chromatographic focusing by arranging f zones in series where f is an integer and is larger than four, said zones being sequentially numbered from zone F(f) to zone F(1) wherein zone F(f) is arbitrarily defined as the upstream end and zone F(1) is arbitrarily defined as the downstream end, each zone having an incoming joint fluidly connecting with an inlet tube and an outgoing joint fluidly communicating with an outlet tube, a column of chromatography being detachably installed in-between the incoming joint and the outgoing joint of each zone, said columns having a stationary phase chromatographic stationary phases that include ion exchange, affinity, chelating, chiral, ligand exchange, size exclusion, monolithic, polymeric, normal phases, and having a stationary phase, each inlet tube and each outlet tube having an additional branched opening and the branched opening of the outlet tube of one zone being connected with the branched opening of the inlet tube of the adjacent downstream zone to form a fluid passage between the two zones, the branched opening of the inlet tube of zone F(f) and the branched opening of the outlet tube of zone F(1) being sealed or eliminated during tube manufacturing to allow a fluid entering the inlet tube of zone F(f) and exiting the outlet tube of zone F(1);

(2) selecting at least four inlet tubes and at least two outlet tubes in the F section for fluid delivery and fluid withdrawal with the requirement that at least one fluid passage has both the inlet tube and the outlet tube selected, blocking the unselected outlet tubes and the unselected inlet tubes, determining fluid compositions and flow rates for each of the selected outlet tubes and the selected inlet tubes to generate a desired desorption gradient, hydrophobic gradient, pH gradient, chelating gradient, hydrogen bonding gradient, affinity gradient, chiral gradient and other gradients for said unselected inlet tubes and said unselected outlet tubes being optionally built without the branched openings so that they can replace the branched openings to form the fluid passages;

(3) performing chromatographic focusing in the F section by:

(a) continuously and simultaneously delivering and withdrawing the following fluids of defined compositions at defined flow rates through the selected inlet tubes and the selected outlet tubes with pumps, including:

delivering an eluent of high desorption strength into the inlet tube of zone F(f);

delivering a sample solution into at least one selected inlet tube;

delivering focusing solutions of lower desorption strengths into the remaining selected inlet tubes, a focusing solution being delivered through the inlet tube of one zone and being mixed with the eluent from its adjacent upstream zone to form a different eluent of lower desorption strength that flows into said zone, a desorption gradient being thus generated in the F section with the eluent of zone F(f) having the highest desorption strength and the eluent of zone F(1) having the lowest desorption strength, there being at least four levels of desorption strengths among the zones of the F section;

collecting the flow-out fluid from the outlet tube of zone F(1), withdrawing fluids from the remaining selected outlet tubes at a flow rate smaller than 50% of the flow rate for the eluent;

(b) periodically and simultaneously relocating the column in zone F(f) to zone F(1) and relocating the rest columns one zone upstream for continuous chromatographic focusing, components of a sample being introduced in a zone, absorbed on the column in the zone, brought zone by zone upstream by column relocations, selectively desorbed from different zones due to the differences in desorption strengths, and separated from each other, a component desorbed from a zone being eluted back to the adjacent downstream zone where said component is reabsorbed on the column of said adjacent downstream zone that contains newly introduced sample, said component being again brought to said zone by the next column relocation and being thus retained and accumulated between said zone and said downstream zone by continuous sample delivery and repeatedly column relocation.

2. A process of claim 1 wherein simultaneous relocation of the columns is realized by simultaneously switching the fluids one zone upstream with fluid diverting rotary valves.

3. A process of claim 1 wherein the simultaneous relocation of the columns is mechanically realized by simultaneously disconnecting the columns from the current zones and reinstalling said columns in the adjacent upstream zones.

4. A process of claim 1 wherein the fluid withdrawal from at least one zone in the F section is done by fluid displacement, additional operations for the displacement comprising:

(1) simultaneously stopping fluid delivery and fluid withdrawal in the F section;
(2) blocking the fluid passage between the inlet tube of the displacement zone and the outlet tube of the adjacent upstream zone and the fluid passage between the outlet tube of said fluid displacement zone and the inlet tube of the adjacent downstream zone, said blocking process being realized by means for blocking;
(3) delivering a displacement fluid from the inlet tube of the displacement zone and collecting the displaced fluid through the outlet tube of said displacement zone, said displacement fluid having the same composition as the eluent in the displacement zone during normal operation;
(4) Releasing said blocking and resuming the normal process described in claim 1, said blocking and releasing said blocking being optionally realized by switching three-way valves.

5. A process of claim 1 wherein the fluid withdrawal from at least one zone in the F section is done by fluid displacement, additional operations for the fluid-displacement including:

(1) simultaneously, blocking the fluid passage between the inlet tube of the displacement zone and the outlet tube of the adjacent upstream zone, collecting the fluid from the outlet tube of said adjacent upstream zone, delivering displacement fluid from the inlet tube of the displacement zone, said blocking being realized by means for blocking, said displacement fluid having the same composition as the eluent in the displacement zone during normal operation;
(2) simultaneously, releasing said blocking, stopping the displacement fluid delivery, and resuming the normal operations described in claim 1, said blocking and releasing said blocking being preferably realized by switching three-way valves.

6. A process of claim 1 wherein the branched opening of the inlet tube of zone F(f) and the branched opening of the outlet tube of zone F(1) are connected to form a fluid passage, a fraction of the flow out fluid from zone F(1) being collected from the outlet tube of zone F(1) and the remaining said flow out fluid flowing into zone F(f) through said fluid passage to form a circular unidirectional fluid flow in the F section that may be maintained by a pump or a check valve.

7. A process of claim 6 wherein the simultaneous relocation of the columns is realized by simultaneously switching the fluids one zone upstream with fluid diverting rotary valves.

8. A process of claim 6 wherein the simultaneous relocation of the columns is mechanically realized by simultaneously disconnecting the columns from the current zones and reinstalling said columns in the adjacent upstream zones.

9. A process of claim 6 wherein the fluid withdrawal from at least one zone in the F section is done by fluid displacement, additional operations for the displacement comprising:

(1) simultaneously stopping fluid delivery and fluid withdrawal in the F section;
(2) blocking the fluid passage between the inlet tube of the displacement zone and the outlet tube of the adjacent upstream zone and the fluid passage between the outlet tube of said fluid displacement zone and the inlet tube of the adjacent downstream zone, said blocking process being realized by means for blocking;
(3) delivering a displacement fluid from the inlet tube of the displacement zone and collecting the displaced fluid through the outlet tube of said displacement zone, said displacement fluid having the same composition as the eluent in the displacement zone during normal operation;
(4) Releasing said blocking and resuming the normal process described in claim 6, said blocking and releasing said blocking being optionally realized by switching three-way valves.

10. A process of claim 6 wherein the fluid withdrawal from at least one zone in the F section is done by fluid displacement, additional operations for the fluid-displacement including:

(1) simultaneously, blocking the fluid passage between the inlet tube of the displacement zone and the outlet tube of the adjacent upstream zone, collecting the fluid from the outlet tube of said adjacent upstream zone, delivering displacement fluid from the inlet tube of said displacement zone, said blocking being realized by means of blocking, said displacement fluid having the same composition as the eluent in said displacement zone during normal operation;
(2) simultaneously, releasing said blocking, stopping the displacement fluid delivery, and resuming the normal operations described in claim 6, said blocking and releasing said blocking being optionally realized by switching three-way valves.

11. A process of claim 1 wherein additional r zones are connected in the same way as the zones in the F section described in claim 1 to form a R section for column regeneration and are sequentially numbered from zone R(r) to zone R(1) where r is an integer, the R section being positioned upstream of the F section of claim 1 with zone R(1) adjacent to zone F(f), the branched opening of the inlet tube of zone R(r) and the branched opening of the outlet tube of zone R(1) being sealed or eliminated during tube manufacturing to form a flow path from the inlet tube of zone R(r) to the outlet tube of zone R(1), if no additional fluid delivery and fluid withdrawal in the R section, the inlet tubes other than the inlet tube of zone R(r) and the outlet tubes other than the outlet tube of zone R(1) being optionally sealed, or being optionally built without the branched openings to replace the branched openings for fluid passage connection, the modifications to the process of claim 1 further comprising:

(1) an additional fluid delivery and withdrawal: continuously delivering a regeneration solution from the inlet tube of zone R(r) and collecting the regeneration solution from the outlet tube of zone R(1);
(2) a modification on column relocation: periodically and simultaneously, relocating the column in zone R(r) to zone F(1), relocating the column in zone F(f) to zone R(1), relocating the rest columns from the current zones to the corresponding adjacent upstream zones.

12. A process of claim 11 wherein the simultaneous relocation of the columns is realized by simultaneously switching the fluids one zone upstream with fluid diverting rotary valves.

13. A process of claim 11 wherein the simultaneous relocation of the columns is mechanically realized by simultaneously disconnecting the columns from the current zones and reinstalling said columns in the adjacent upstream zones.

14. A process of claim 11 wherein the fluid withdrawal from at least one zone in the F section is done by fluid displacement, additional operations for the displacement comprising:
(1) simultaneously stopping fluid delivery and fluid withdrawal at least in the F section;
(2) blocking the fluid passage between the inlet tube of the displacement zone and the outlet tube of the adjacent upstream zone and the fluid passage between the outlet tube of said fluid displacement zone and the inlet tube of the adjacent downstream zone, said blocking process being realized by means for blocking;
(3) delivering a displacement fluid from the inlet tube of the displacement zone and collecting the displaced fluid through the outlet tube of said displacement zone, said displacement fluid having the same composition as the eluent in said displacement zone during normal operation;
(4) Releasing said blocking and resuming the normal process described in claim 11, said blocking and releasing said blocking being optionally realized by switching three-way valves.

15. A process of claim 11 wherein the fluid withdrawal from at least one zone in the F section is done by fluid displacement, additional operations for the fluid-displacement including:
(1) simultaneously, blocking the fluid passage between the inlet tube of the displacement zone and the outlet tube of the adjacent upstream zone, collecting the fluid from the outlet tube of said adjacent upstream zone, delivering a displacement fluid from the inlet tube of said displacement zone, said blocking being realized by means for blocking, said displacement fluid having the same composition as the eluent in said displacement zone during normal operation;
(2) simultaneously, releasing said blocking, stopping the delivery of the displacement fluid, and resuming the normal operations described in claim 11, said blocking and releasing said blocking being optionally realized by switching three-way valves.

16. A process of claim 11 wherein additional b zones are connected in the same way as the zones of the F section described in claim 11 to form a B section for column balancing and are sequentially numbered from zone B(b) to zone B(1) where b is an integer, the B section being positioned upstream of the R section of claim 11 with zone B(1) adjacent to zone R(r), the branched opening of the inlet tube of zone B(b) and the branched opening of the outlet tube of zone B(1) being sealed or eliminated during tube manufacturing to form a flow path from the inlet tube of zone B(b) to the outlet tube of zone B(1), if no additional fluid delivery and fluid withdrawal in the R section, the inlet tubes other than the inlet tube of zone R(r) and the outlet tubes other than the outlet tube of zone R(1) being optionally sealed, or being optionally built without the branched openings to replace the branched openings for fluid passage connection, the modifications to the process of claim 11 further comprising:
(1) an additional fluid delivery and withdrawal: continuously delivering a balancing solution from the inlet tube of zone B(b) and collecting the balancing solution from the outlet tube of zone B(1);
(2) a modification on column relocation: periodically and simultaneously, relocating the column in zone B(b) to zone F(1), relocating the column in zone F(f) to zone R(1), relocating the column in zone R(r) to zone B(1), relocating the rest columns from the current zones to the corresponding adjacent upstream zones.

17. A process of claim 16 wherein the simultaneous relocation of the columns is realized by simultaneously switching the fluids one zone upstream with fluid diverting rotary valves.

18. A process of claim 16 wherein the simultaneous relocation of the columns is mechanically realized by simultaneously disconnecting the columns from the current zones and reinstalling said columns in the adjacent upstream zones.

19. A process of claim 16 wherein the fluid withdrawal from at least one zone in the F section is done by fluid displacement, additional operations for the displacement comprising:
(1) simultaneously stopping fluid delivery and fluid withdrawal at least in the F section;
(2) blocking the fluid passage between the inlet tube of the displacement zone and the outlet tube of the adjacent upstream zone and the fluid passage between the outlet tube of said fluid displacement zone and the inlet tube of the adjacent downstream zone, said blocking process being realized by means for blocking;
(3) delivering a displacement fluid from the inlet tube of the displacement zone and collecting the displacement fluid through the outlet tube of said displacement zone, said displacement fluid having the same composition as the eluent in the displacement zone during normal operation;
(4) Releasing said blocking and resuming the normal process described in claim 16, said blocking and releasing said blocking being optionally realized by switching three-way valves.

20. A process of claim 16 wherein the fluid withdrawal from at least one zone in the F section is done by fluid displacement, additional operations for the fluid-displacement including:
(1) simultaneously, blocking the fluid passage between the inlet tube of the displacement zone and the outlet tube of the adjacent upstream zone, collecting the fluid from the outlet tube of said adjacent upstream zone, delivering displacement fluid from the inlet tube of said displacement zone, said blocking being realized by means for blocking, said displacement fluid having the same composition as the eluent in said displacement zone during normal operation;
(2) simultaneously, releasing said blocking, stopping the delivery of the displacement fluid, and resuming the normal operations described in claim 16, said blocking and releasing said blocking being optionally realized by switching three-way valves.

21. A process of claim 16 wherein additional s zones are connected in the same way as the zones of the F section described in claim 16 to form a S section for sample loading and are sequentially numbered from zone S(s) to zone S(1) where s is an integer, the S section being positioned upstream of the B section with zone S(1) adjacent to zone B(b), the branched opening of the inlet tube of zone S(s) and the branched opening of the outlet tube of zone S(1) being sealed or eliminated during tube manufacturing to form a flow path from the inlet tube of zone S(s) to the outlet tube of zone S(1), if no additional fluid delivery and fluid withdrawal in the R section, the inlet tubes other than the inlet tube of zone R(r) and the outlet tubes other than the outlet tube of zone R(1) being optionally sealed, or being optionally built without the branched openings to replace the branched openings for fluid passage connection, the modifications to the process of claim 16 further comprising:
- (1) an additional fluid delivery and withdrawal: continuously delivering a sample solution from the inlet tube of zone S(s) and collecting the fluid from the outlet tube of zone S(1);
- (2) a modification on column relocation: periodically and simultaneously, relocating the column in zone R(r) to zone B(1), relocating the column in zone B(b) to zone S(1), relocating the column in zone S(s) to zone F(1), relocating the column in zone F(f) to zone R(1), relocating the rest columns from the current zones to the corresponding adjacent upstream zones.

22. A process of claim 21 wherein the simultaneous relocation of the columns is realized by simultaneously switching the fluids one zone upstream with fluid diverting rotary valves.

23. A process of claim 21 wherein the simultaneous relocation of the columns is mechanically realized by simultaneously disconnecting the columns from the current zones and reinstalling said columns in the adjacent upstream zones.

24. A process of claim 21 wherein the fluid withdrawal from at least one zone in the F section is done by fluid displacement, additional operations for the displacement comprising:
- (1) simultaneously stopping fluid delivery and fluid withdrawal at least in the F section;
- (2) blocking the fluid passage between the inlet tube of the displacement zone and the outlet tube of the adjacent upstream zone and the fluid passage between the outlet tube of said fluid displacement zone and the inlet tube of the adjacent downstream zone, said blocking process being realized by means for blocking;
- (3) delivering a displacement fluid from the inlet tube of the displacement zone and collecting the displaced fluid through the outlet tube of said displacement zone, said displacement fluid having the same composition as the eluent in said displacement zone during normal operation;
- (4) Releasing said blocking and resuming the normal process described in claim 21, said blocking and releasing said blocking being optionally realized by switching three-way valves.

25. A process of claim 21 wherein the fluid withdrawal from at least one zone in the F section is done by fluid displacement, additional operations for the fluid-displacement including:
- (1) simultaneously, blocking the fluid passage between the inlet tube of the displacement zone and the outlet tube of the adjacent upstream zone, collecting the fluid from the outlet tube of said adjacent upstream zone, delivering displacement fluid from the inlet tube of said displacement zone, said blocking being realized by means for blocking, said displacement fluid having the same composition as the eluent in said displacement zone during normal operation;
- (2) simultaneously, releasing said blocking, stopping the delivery of the displacement fluid, and resuming the normal operations described in claim 21, said blocking and releasing said blocking being optionally realized by switching three-way valves.

26. A process of claim 21 wherein the R section is eliminated and zone B(1) is adjacent to zone F(f), the modifications to the process of claim 21 further comprising:
- (1) eliminating the delivery of a regeneration solution into the inlet tube of zone R(r) and the withdrawal of the regeneration solution from the outlet tube of zone R(1);
- (2) Periodically and simultaneously, relocating the column in zone F(f) to zone B(1), relocating the column in zone B(b) to zone S(1), relocating the column in zone S(s) to zone F(1), relocating the rest columns from the current zones to the corresponding adjacent upstream zones.

27. A process of claim 26 wherein the simultaneous relocation of the columns is realized by simultaneously switching the fluids one zone upstream with fluid diverting rotary valves.

28. A process of claim 26 wherein the simultaneous relocation of the columns is mechanically realized by simultaneously disconnecting the columns from the current zones and reinstalling said columns in the adjacent upstream zones.

29. A process of claim 26 wherein the fluid withdrawal from at least one zone in the F section is done by fluid displacement, additional operations for the displacement comprising:
- (1) simultaneously stopping fluid delivery and fluid withdrawal at least in the F section;
- (2) blocking the fluid passage between the inlet tube of the displacement zone and the outlet tube of the adjacent upstream zone and the fluid passage between the outlet tube of the fluid displacement zone and the inlet tube of the adjacent downstream zone, said blocking process being realized by means for blocking;
- (3) delivering a displacement fluid from the inlet tube of the displacement zone and collecting the displaced fluid through the outlet tube of said displacement zone, said displacement fluid having the same composition as the eluent in said displacement zone during normal operation;
- (4) Releasing said blocking and resuming the normal process described in claim 26, said blocking and releasing said blocking being optionally realized by switching three-way valves.

30. A process of claim 26 wherein the fluid withdrawal from at least one zone in the F section is done by fluid displacement, additional operations for the fluid-displacement including:
- (1) simultaneously, blocking the fluid passage between the inlet tube of the displacement zone and the outlet tube of the adjacent upstream zone, collecting the fluid from the outlet tube of said adjacent upstream zone, delivering displacement fluid from the inlet tube of said displacement zone, said blocking being realized by means for blocking, said displacement fluid having the same composition as the eluent in said displacement zone during normal operation;
- (2) simultaneously, releasing said blocking, stopping the delivery of the displacement fluid, and resuming the normal operations described in claim 26, said blocking and releasing said blocking being optionally realized by switching three-way valves.

31. A process of claim 26 wherein the B section is eliminated and zone S(1) is adjacent to zone F(f), the modifications to the process of claim 26 further comprising:
- (1) eliminating the delivery of a balancing solution into the inlet tube of zone B(b) and the withdrawal of the balancing solution from the outlet tube of zone B(1);
- (2) Periodically and simultaneously, relocating the column in zone F(f) to zone S(1), relocating the column in zone S(s) to zone F(1), relocating the rest columns from the current zones to the corresponding adjacent upstream zones.

32. A process of claim 31 wherein the simultaneous relocation of the columns is realized by simultaneously switching the fluids one zone upstream with fluid diverting rotary valves.

33. A process of claim 31 wherein the simultaneous relocation of the columns is mechanically realized by simultaneously disconnecting the columns from the current zones and reinstalling said columns in the adjacent upstream zones.

34. A process of claim 31 wherein the fluid withdrawal from at least one zone in the F section is done by fluid displacement, additional operations for the displacement comprising:

(1) simultaneously stopping fluid delivery and fluid withdrawal at least in the F section;

(2) blocking the fluid passage between the inlet tube of the displacement zone and the outlet tube of the adjacent upstream zone and the fluid passage between the outlet tube of said fluid displacement zone and the inlet tube of the adjacent downstream zone, said blocking process being realized by means for blocking;

(3) delivering a displacement fluid from the inlet tube of the displacement zone and collecting the displaced fluid through the outlet tube of said displacement zone, said displacement fluid having the same composition as the eluent in said displacement zone during normal operation;

(4) Releasing said blocking and resuming the normal process described in claim 31, said blocking and releasing said blocking being optionally realized by switching three-way valves.

35. A process of claim 31 wherein the fluid withdrawal from at least one zone in the F section is done by fluid displacement, additional operations for the fluid-displacement including:

(1) simultaneously, blocking the fluid passage between the inlet tube of the displacement zone and the outlet tube of the adjacent upstream zone, collecting the fluid from the outlet tube of said adjacent upstream zone, delivering displacement fluid from the inlet tube of said displacement zone, said blocking being realized by means for blocking, said displacement fluid having the same composition as the eluent in said displacement zone during normal operation;

(2) simultaneously, releasing said blocking, stopping the delivery of the displacement fluid, and resuming the normal operations described in claim 31, said blocking and releasing said blocking being optionally realized by switching three-way valves.

36. The process of claim 1, wherein the chromatographic stationary phases are selected from the group consisting of ion exchange, affinity, chelating, chiral, ligand exchange, size exclusion, monolithic, polymeric, normal phases, and reversed phases.

37. The process of claim 1, wherein the desorption gradient is selected from the group consisting of ion strength gradient, hydrophobic gradient, pH gradient, chelating gradient, hydrogen bonding gradient, affinity gradient, and chiral gradient.

* * * * *